No. 747,122. PATENTED DEC. 15, 1903.
C. F. BLACKBURN.
CORN HARVESTING ATTACHMENT FOR MOWING MACHINES.
APPLICATION FILED OCT. 12, 1903.
NO MODEL. 2 SHEETS—SHEET 1.
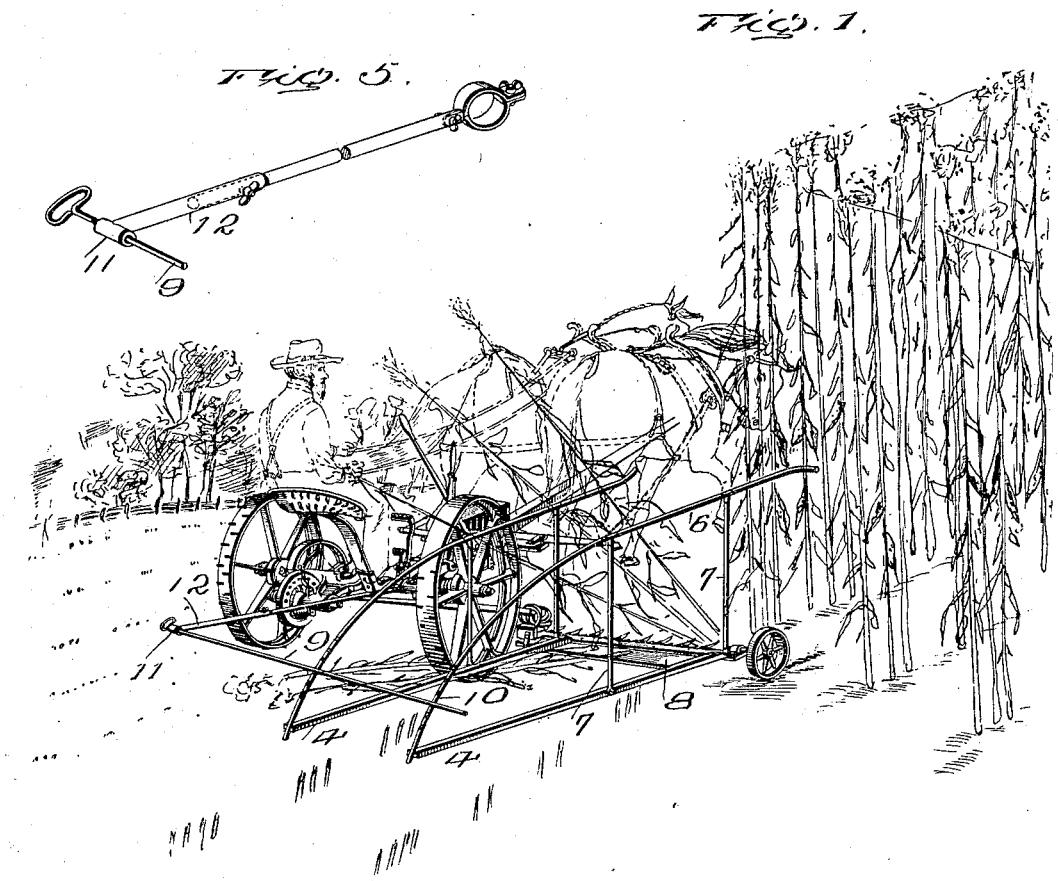
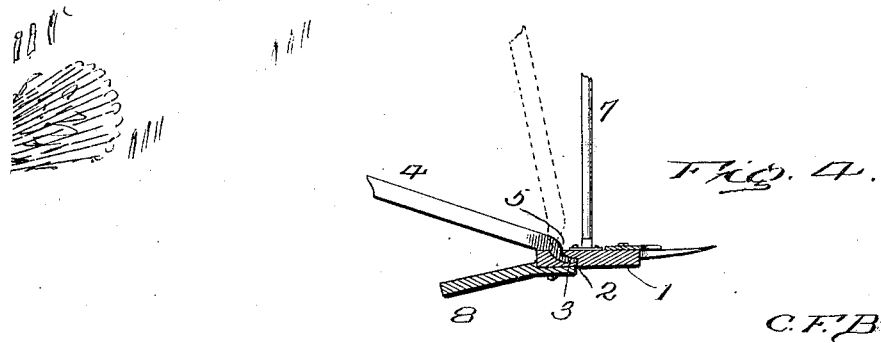
Witnesses
Inventor
C. F. Blackburn
By R. S. & A. B. Lacey Attorneys No. 747,122. PATENTED DEC. 15, 1903.
C. F. BLACKBURN.
CORN HARVESTING ATTACHMENT FOR MOWING MACHINES.
APPLICATION FILED OCT. 12, 1903.
NO MODEL. 2 SHEETS—SHEET 2.
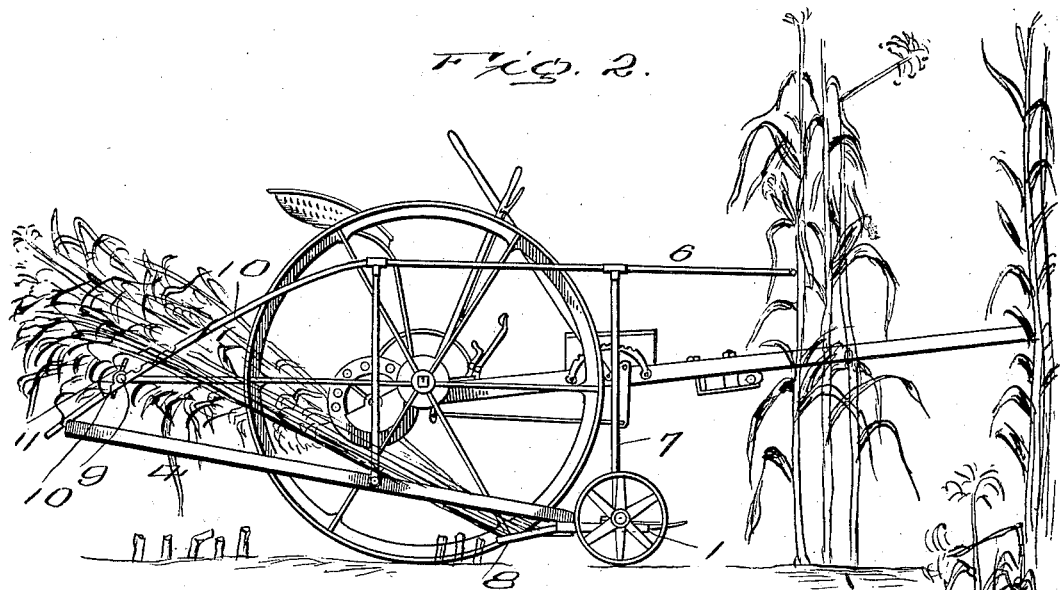
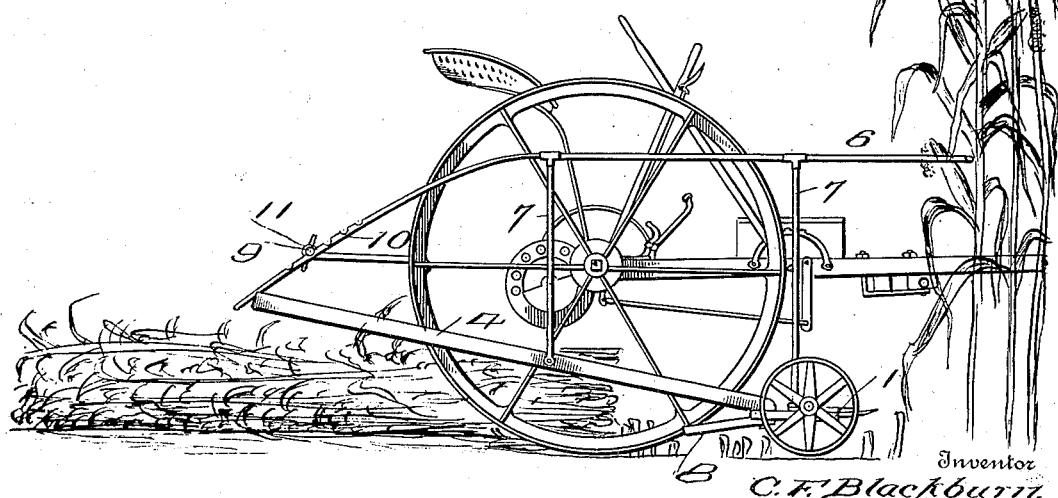

No. 747,122. Patented December 15, 1903.

UNITED STATES PATENT OFFICE.

CHARLES F. BLACKBURN, OF GARRESONVILLE, VIRGINIA.

CORN-HARVESTING ATTACHMENT FOR MOWING-MACHINES.

SPECIFICATION forming part of Letters Patent No. 747,122, dated December 15, 1903.

Application filed October 12, 1903. Serial No. 176,724. (No model.)

*To all whom it may concern:*

Be it known that I, CHARLES F. BLACKBURN, a citizen of the United States, residing at Garresonville, in the county of Stafford and State of Virginia, have invented certain new and useful Improvements in Corn-Harvesting Attachments for Mowing-Machines, of which the following is a specification.

The arduousness of harvesting corn in the way commonly practiced is well known to farmers, and machinery specially designed for this purpose is expensive and not within reach of the average agriculturist, hence adherence to the old way of harvesting corn by hand for the most part.

This invention enables the use of the ordinary mowing-machine for the successful harvesting of corn and like growth by devising an attachment which may be easily and quickly fitted thereto with the greatest facility and which may be disconnected therefrom at a moment's notice when not required for immediate use and stowed away in a compact form, so as to occupy the smallest amount of space possible.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a mowing-machine having the corn-harvester attachment applied thereto, showing the manner of operation. Fig. 2 is a side elevation of the mower having the attachment in position and illustrating the manner of supporting a number of stalks to form a bunch. Fig. 3 is a view similar to Fig. 2, illustrating the manner of discharging the bunch. Fig. 4 is a detail view showing the manner of connecting the attachment to the bar or plate of the mower cutting mechanism. Fig. 5 is a detail view of the arm for the supporting-rod, showing the clamp for attachment thereof to the axle.

Corresponding and like parts are referred to in the following description and indicated in all the views of the drawings by the same reference characters.

The mowing-machine illustrated is of ordinary construction, being selected to demonstrate the application of the invention.

The bar or plate 1 of the cutting mechanism is provided near each end with a longitudinally-curved socket 2, in which is fitted the interlocking extension 3 at the front end of the side bar 4, the joint being effected by a longitudinal and pivotal movement of the side bar whereby the curved projection 3 is entered into the socket 2, as when placing the attachment in position, or removed therefrom when disconnecting the attachment from the machine. The side bars 4, two in number, incline rearwardly and upwardly and extend about in parallel relation and may be of metal or wood. When made of wood, the front ends of the side bars are reinforced by metal tips, which are provided with the curved interlocking extensions 3. The bars 4 obtain a purchase upon the plate or bar 1 in the rear of the interlocking extension 3, as shown at 5, the weight of the bars 4 being sufficient to retain them in place and the length and size of the interlocking extension 3 being such as to insure the formation of a stable joint.

Guard-bars 6 are located above the side bars 4 and curve rearward and downward toward their hind ends, which are secured to the bars 4 in any manner. The front ends of the guard-bars curve outward, as shown most clearly in Fig. 1, to form a flaring mouth for guidance of the stalks between the bars in the operation of the machine. Uprights or posts 7 connect the guard-bars with the side bars and plate 1 and are connected to the respective parts in any substantial way. The foremost uprights 7 are detachably connected at their lower ends to the plate or bar 1 and are preferably flanged for this purpose to provide an extended and substantial bearing, the flanges being apertured for reception of the fastenings by means of which the connection is made.

A board 8 is located in the rear of the plate or bar 1 and inclines rearwardly and downwardly and is designed to support the butt-ends of the stocks in the formation of a bunch.

The top ends of the stalks when cut are supported by means of the rod 9, which extends transversely of the space formed between the guard-bars 6. The supporting-rod 9 may be prevented from slipping by engaging with suitable stops or seats of the bars 6, and, as shown, a series of notches 10 are provided in the upper side of the rear curved ends of the guards. When the stalks are cut, they fall rearwardly, as indicated in Figs. 1 and 2, the butt-ends resting upon the board 8 and the upper ends falling upon the rod 9. After a sufficient number of stalks have accumulated to form a bunch of required size the rod 9 is withdrawn, thereby permitting the top ends of the stalks to fall upon the ground, and the machine continuing to advance the bunch is withdrawn from the board 8, as indicated most clearly in Fig. 3 and as will be readily comprehended.

The rod 9 is slidably mounted in the sleeve 11 at the outer or rear end of arm 12, which is secured to the axle of the mower in any determinate way. The parts are so disposed that the handle end of the rod 9 is within convenient reach of the driver's seat. In order to adapt the contrivance for stalks of varying height, the rod 9 is adjustable on the guards 6, and to allow for this adjustment the arm 12 is extensible, being composed of telescoping sections secured in an adjusted position by clamp-screws 13 and is clamped to the axle, so as to be turned thereon to adapt the rod 9 to the selected position.

The attachment is readily applied to a mower by securing the foremost upright 7 to the plate 1 and slipping the interlocking extensions 3 into the sockets 2 of said plate and by clamping arm 12 to the axle. When disconnected from the mower, the attachment may be stored in a small space and readily handled, the parts being comparatively light and adapted to lie one upon or against the other.

Having thus described the invention, what is claimed as new is—

1. A corn-harvesting attachment for mowing-machines, the same comprising side bars, means for connecting said side bars to the plate or bar of the mower cutting apparatus, guard-bars connected to the respective side bars and rearwardly and downwardly curved at their hind ends, and supporting means cooperating with opposite ends of the side and guard bars for sustaining the stalks, substantially as set forth.

2. A harvesting attachment for mowing-machines, the same comprising side bars and provided at their front ends with longitudinally-curved extensions to make interlocking connection with the plate or bar of the mower cutting apparatus, guard-bars arranged above the respective side bars and rearwardly and downwardly curved at their hind ends, a support at the front ends of said side bars for sustaining the butt-ends of the stalks, and a supporting-rod sustained upon the rear curved ends of the guard-bars for receiving the top ends of the stalks, substantially as specified.

3. In a corn-harvesting attachment for mowing-machines, the combination of side and guard bars, means for supporting the butt-ends of the stalks, a rod for supporting the top ends of the stalks, and an arm for slidably receiving the supporting-rod and composed of extensible sections and adjustably connected to the mowing-machine, substantially as set forth.

4. In a corn-harvesting attachment for mowing-machines, the combination of coöperating side and guard bars, a board immediately in the rear of the mower cutting apparatus and rearwardly and downwardly inclined and adapted to support the butt-ends of the stalks, and a supporting-rod sustained upon the rear ends of the guard-bars and adapted to receive the top ends of the stalks, substantially as set forth.

5. In a mowing-machine, the combination of the plate or bar of the cutting apparatus provided near its ends with longitudinally-curved sockets, side bars having longitudinally-curved extensions to make interlocking connection with said sockets, guard-bars arranged above the side bars and inwardly and downwardly curved at their rear ends and provided with a series of supports upon their rear curved ends, a rearwardly and downwardly inclined supporting-board immediately in the rear of the mower cutting apparatus, a supporting-rod, and an extensible arm slidably supporting said rod and adjustably connected to the mower, substantially as specified.

In testimony whereof I affix my signature in presence of two witnesses.

CHARLES F. BLACKBURN. [L. S.]

Witnesses:
E. S. MOORE,
R. H. BRYAN.